US012761816B2

(12) United States Patent
Panda et al.

(10) Patent No.: US 12,761,816 B2
(45) Date of Patent: Oct. 13, 2026

(54) HASH FILTER-BASED SELECTIVE-ROW REFRESH IN MEMORY DEVICE

(71) Applicant: QUALCOMM Incorporated, San Diego, CA (US)

(72) Inventors: Subham Panda, Balasore (IN); Muzaffaruddin Mohammed, Hyderabad (IN); Sri Ananda Sai Jannabhatla, Hyderabad (IN); Venkatesh Petnikota, Kurnool (IN); Jyothi Ramidi, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 203 days.

(21) Appl. No.: 18/321,535

(22) Filed: May 22, 2023

(65) Prior Publication Data

US 2024/0393964 A1 Nov. 28, 2024

(51) Int. Cl.
*G06F 3/06* (2006.01)

(52) U.S. Cl.
CPC .......... *G06F 3/0625* (2013.01); *G06F 3/0659* (2013.01); *G06F 3/0673* (2013.01)

(58) Field of Classification Search
CPC .... G06F 3/9625; G06F 3/0659; G06F 3/0673; G06F 13/1636; G11C 2211/4067; G11C 11/40622; G11C 11/40611
See application file for complete search history.

(56) References Cited

U.S. PATENT DOCUMENTS 9,448,927 B1 * 9/2016 Agarwala ........... G06F 16/1748
9,524,235 B1 * 12/2016 Sprouse .................... G06F 3/06
9,928,178 B1 * 3/2018 Solapurkar ........... H04L 67/568
9,967,236 B1 * 5/2018 Ashley .................... H04L 63/20
10,778,721 B1 9/2020 Holbrook et al.
11,520,661 B1 * 12/2022 Jeffet ..................... G11C 16/08
2006/0010264 A1 * 1/2006 Rader ................... G06F 13/385 710/308

(Continued)

FOREIGN PATENT DOCUMENTS

CN 115938423 A * 4/2023 ......... G11C 16/3418
KR 20170084543 A 7/2017

OTHER PUBLICATIONS

Lori Kaufman, "What's the Difference Between Sleep and Hibernate in Windows?", Feb. 3, 2022, pp. 1-14, https://web.archive.org/web/20220203061102/https://www.howtogeek.com/102897/whats-the-difference-between-sleep-and-hibernate-in-windows/#sleep-vs-hibernate (Year: 2022).*

(Continued)

*Primary Examiner* — Christopher D Birkhimer
(74) *Attorney, Agent, or Firm* — NORTON ROSE FULBRIGHT US LLP

(57) ABSTRACT

This disclosure provides systems, methods, and devices for memory systems that support row-selective self-refresh operation while a host processor is in sleep mode. In a first aspect, a method of operating a memory system by a memory controller includes receiving, from the host device through the channel, a hash filter indicating a first subset of rows in a memory array; and refreshing, by the memory controller, a second subset of rows in the memory array based on the hash filter. The hash filter may be a Bloom filter, a Cuckoo filter, a linear probing filter, or a XOR filter. Other aspects and features are also claimed and described.

22 Claims, 11 Drawing Sheets

(56) References Cited

U.S. PATENT DOCUMENTS

| | | | | |
|---|---|---|---|---|
| 2012/0300237 | A1* | 11/2012 | Yamamoto | H04N 1/00236 358/1.13 |
| 2013/0086384 | A1* | 4/2013 | Perez | G06F 1/3209 713/300 |
| 2014/0029367 | A1 | 1/2014 | Jung et al. | |
| 2014/0281151 | A1* | 9/2014 | Yu | G11C 29/52 711/103 |
| 2015/0106556 | A1* | 4/2015 | Yu | G06F 12/0246 711/103 |
| 2015/0106557 | A1* | 4/2015 | Yu | G11C 13/0004 711/103 |
| 2016/0070474 | A1* | 3/2016 | Yu | G06F 12/0246 711/103 |
| 2016/0180917 | A1 | 6/2016 | Chishti et al. | |
| 2017/0262208 | A1* | 9/2017 | Chooi | G06F 1/3221 |
| 2018/0232310 | A1* | 8/2018 | Chang | G06F 12/0864 |
| 2019/0130961 | A1 | 5/2019 | Bell et al. | |
| 2019/0313224 | A1* | 10/2019 | Yu | H04L 67/12 |
| 2020/0098420 | A1 | 3/2020 | Li et al. | |
| 2021/0303432 | A1* | 9/2021 | Chang | G06F 11/004 |
| 2022/0121393 | A1* | 4/2022 | Keeth | G11C 29/08 |
| 2022/0253243 | A1* | 8/2022 | Kataria | G06F 3/067 |
| 2023/0046552 | A1* | 2/2023 | Mathew | G06F 3/0659 |
| 2023/0147402 | A1 | 5/2023 | Kim | |
| 2023/0155608 | A1* | 5/2023 | Yoskovits | G11C 29/52 714/758 |
| 2023/0300748 | A1* | 9/2023 | Das | H04W 52/0235 |
| 2024/0393964 | A1* | 11/2024 | Panda | G11C 11/40622 |

OTHER PUBLICATIONS

Liu J., et al., "RAIDR: Retention-Aware Intelligent DRAM Refresh", Proceeding ISCA '12 Proceedings of the 39th Annual International Symposium on Computer Architecture, vol. 40, No. 3, Jun. 2012, pp. 1-12.

International Search Report and Written Opinion—PCT/US2024/023047—SA/EPO—Jun. 14, 2024 (2301536WO).

Liu J., et al., "RAIDR: Retention-Aware Intelligent DRAM Refresh", Computer Architecture (ISCA), 2012, 39th Annual International Symposium on, IEEE, Jun. 9, 2012, pp. 1-12, XP032200017, Sections 3.3-3.4.

* cited by examiner

HASH FILTER-BASED SELECTIVE-ROW REFRESH IN MEMORY DEVICE

TECHNICAL FIELD

Aspects of the present disclosure relate generally to computer information systems, and more particularly, to memory systems for storing data. Some features may enable and provide improved memory capabilities for lower power operation through the use of a hash filter-based selective row refresh of memory cells in the memory system.

INTRODUCTION

A computing device (e.g., a laptop, a mobile phone, etc.) may include one or several processors to perform various computing functions, such as telephony, wireless data access, and camera/video function, etc. A memory system is an important component of the computing device. The processors may be coupled to the memory system to perform the aforementioned computing functions. For example, the processors may fetch instructions from the memory system to perform the computing functions and/or to store within the memory system temporary data involved in performing these computing functions.

Memory systems may make use of memory cells that are volatile in nature. Volatile memory cells retain information for short periods of time, such as fractions of a second. A refresh operation may be performed with volatile memory cells to maintain the information for longer periods of time. In an example volatile memory cell storing information as an electrical charge, the electrical charge decays over a fraction of a second. Before the charge decays beyond the point of lost information, the memory cell may be refreshed to extend the period of time that the memory cell retains the information. In some cases the refresh may be repeatedly performed to extend the period of storage of the information indefinitely, or as long as electricity is supplied to the circuit. This refresh operation consumes power, which impacts the operation of devices operating from limited power sources, such as with mobile devices operating from battery power.

One conventional technique for reducing power consumption is Partial-Array Self-Refresh (PASR), which is a lower-power refresh mode in which some banks in the memory system are refreshed while other banks are turned off to save power. The non-refreshed banks will lose information stored therein.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some aspects, a selective row refresh technique is described for memory systems to allow a refresh operation to maintain the information stored in specific rows of the memory cells. The selective refresh technique may be performed by activating only the identified subset of rows for refresh to reduce the time of a refresh cycle and reduce power consumption by the refresh cycle. In different embodiments, the rows for refresh may be selected by a hashing filter including, for example, a Bloom filter, a Cuckoo filter, linear probing, and/or XOR filters. A filter value may be determined by identifying rows with information to retain. The refresh operation may be performed based on this filter value to identify addresses corresponding to a sequence of rows to refresh during a refresh cycle, while omitting the generating of addresses not identified by the hash filter value during the refresh operation. Redundant refresh operations may thus be skipped for empty rows.

In some embodiments, the hash filter value may be determined by a processor (e.g., an applications processor) or other logic device storing information in the memory system by tracking the addresses of locations in the memory system (e.g., a double data rate (DDR) memory system) where the processor stores information. The processor may output the hash filter value to the memory system. The memory system then determines a series of row addresses to refresh based on the hash filter value.

In some embodiments, the selective row refresh based on the hash filter value may be performed during a sleep mode of the processor or other logic device. The processor may enter a sleep mode when the user presses a power button or the user does not interact with the device for a predefined period of time. Before entering the sleep mode, the processor may determine a hash filter value corresponding to the locations of information that the processor stored in the memory system and expects to be available when the processor wakes up to perform further processing functions. The processor outputs the hash filter value to the memory system, which may store the hash filter value in a register and/or memory cells of the memory array. The processor then instructs the memory system to enter a self-refresh mode during which the memory system performs refresh operations without input from the processor. The processor then enters a sleep mode during which power consumption by the processor is reduced. Example sleep states may include sleep states such as C0 (Active), C1 (Auto Halt), C2 (Stop Clock), C3 (Deep Sleep), and C4 (Deeper Sleep). Different sleep states may correspond to states in which different parts or combinations of parts of the processor are turned off or reduced in power.

These aspects may be embodied as a sequence of commands transmitted from a host to a memory system. The commands transmitted by the host may include commands to read capabilities from the memory system, set configurations in the memory system, read data at one or more specified addresses from the memory system, and/or write data at one or more specified addresses to the memory system. For example, a host device may comprise a processor and may be coupled to a memory system. The host device, based on instructions from the processor, may issue command(s) to set the hash filter value in the memory system and subsequently issue command(s) to initiate a self-refresh operating mode for the memory system, during which the memory system refreshes rows based on the hash filter value without further instruction from the processor. The processor may wake up out of a sleep state at some time later and issues command(s) to exit the self-refresh operating mode.

An apparatus in accordance with at least one embodiment includes a memory system configured to communicate with a host. The memory system includes a memory array configured to store data. The memory system may include a memory controller configured to provide the data stored in the memory array to the host for further processing by the processor or other components of the host. The memory controller may also be configured to receive data from the host for storage in the memory array. In some embodiments, the memory array may be a plurality of volatile memory cells organized in rows and columns, such as in a dynamic random access memory (DRAM) or static random access memory (SRAM). In other embodiments, the memory array may be a plurality of non-volatile memory cells or a mixture of volatile and non-volatile memory cells.

An apparatus in accordance with at least one other embodiment includes a host device with a memory controller configured to communicate with a memory system to receive data stored in the memory array and/or to store data in the memory array. The host device may be, for example, a user equipment (UE) device such as a cellular phone, a tablet computing device, a personal computer, a server, a smart watch, or an internet of things (IoT) device.

In one aspect of the disclosure, a method for refreshing a memory array includes obtaining, by a memory controller from a host device through a first channel, a hash filter indicating a first subset of rows in a memory array; and refreshing, by the memory controller, a second subset of rows in the memory array based on the hash filter.

In an additional aspect of the disclosure, an apparatus includes a memory controller coupled to a memory array through a first bus and configured to access data stored in a memory array through the first bus, the memory controller configured to couple to a host device through a channel and configured to perform operations comprising obtaining, by a memory controller from a host device through a first channel, a hash filter indicating a first subset of rows in a memory array; and refreshing, by the memory controller, a second subset of rows in the memory array based on the hash filter.

In an additional aspect of the disclosure, an apparatus includes means for obtaining, by a memory controller from a host device through a first channel, a hash filter indicating a first subset of rows in a memory array; and means for refreshing, by the memory controller, a second subset of rows in the memory array based on the hash filter.

In a further aspect of the disclosure, an apparatus includes at least one processor; and a memory controller coupled to the at least one processor and to a memory system through a channel and configured to communicate with the memory system through the channel. The at least one processor is configured to perform operations including saving data to a first subset of rows in a memory array of the memory system through the memory controller; determining a hash filter corresponding to the first subset of rows; and copying, through the memory controller, the hash filter to the memory system.

In a further aspect of the disclosure, a method for configuring a memory device comprises saving, by at least one processor of a host device coupled to a memory system through a channel by a memory controller, data to a first subset of rows in a memory array of the memory system through the memory controller; determining, by the at least one processor, a hash filter corresponding to the first subset of rows; and copying, by the at least one processor through the memory controller, the hash filter to the memory system.

In a further aspect of the disclosure, an apparatus includes means for saving, by at least one processor of a host device coupled to a memory system through a channel by a memory controller, data to a first subset of rows in a memory array of the memory system through the memory controller; means for determining, by the at least one processor, a hash filter corresponding to the first subset of rows; and means for copying, by the at least one processor through the memory controller, the hash filter to the memory system.

In an additional aspect of the disclosure, an apparatus, such as a wireless device, includes at least one processor and a memory coupled to the at least one processor. The at least one processor is configured to communicate with the memory system through a memory controller coupled to a channel that couples the processor to the memory system. The processor may be a processor, controller, or other logic circuitry in a host.

In an additional aspect of the disclosure, a non-transitory computer-readable medium stores instructions that, when executed by a processor, cause the processor to perform operations described herein regarding aspects of the disclosure.

Memory systems in the present disclosure may be embedded within a processor on a semiconductor die or be part of a different semiconductor die. The memory systems may be of various kinds. For example, the memory may be static random access memory (SRAM), dynamic random access memory (DRAM), magnetic random access memory (MRAM), NAND flash, or NOR flash, etc.

Methods and apparatuses are presented in the present disclosure by way of non-limiting examples of Low-Power Double Data Rate (LPDDR) Synchronous Dynamic Random Access Memory (SDRAM). For example, the LPDDR memory operating in accordance with LPDDR specification promulgated by Joint Electronic Device Engineering Council (JEDEC). One such LPDDR specification may be LPDDR5. Another such LPDDR specification may be LPDDR6.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in a recording or as streaming data, over a first network connection of a plurality of network connections. The processor may be coupled to the first network adaptor and a memory for storing data to support the processing and communications operations performed by the processor. The network adaptor may support communication over a wireless communications network such as a 5G NR communication network. The processor may cause the transmission of data stored in memory over the wireless communication network.

The foregoing has outlined, rather broadly, the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
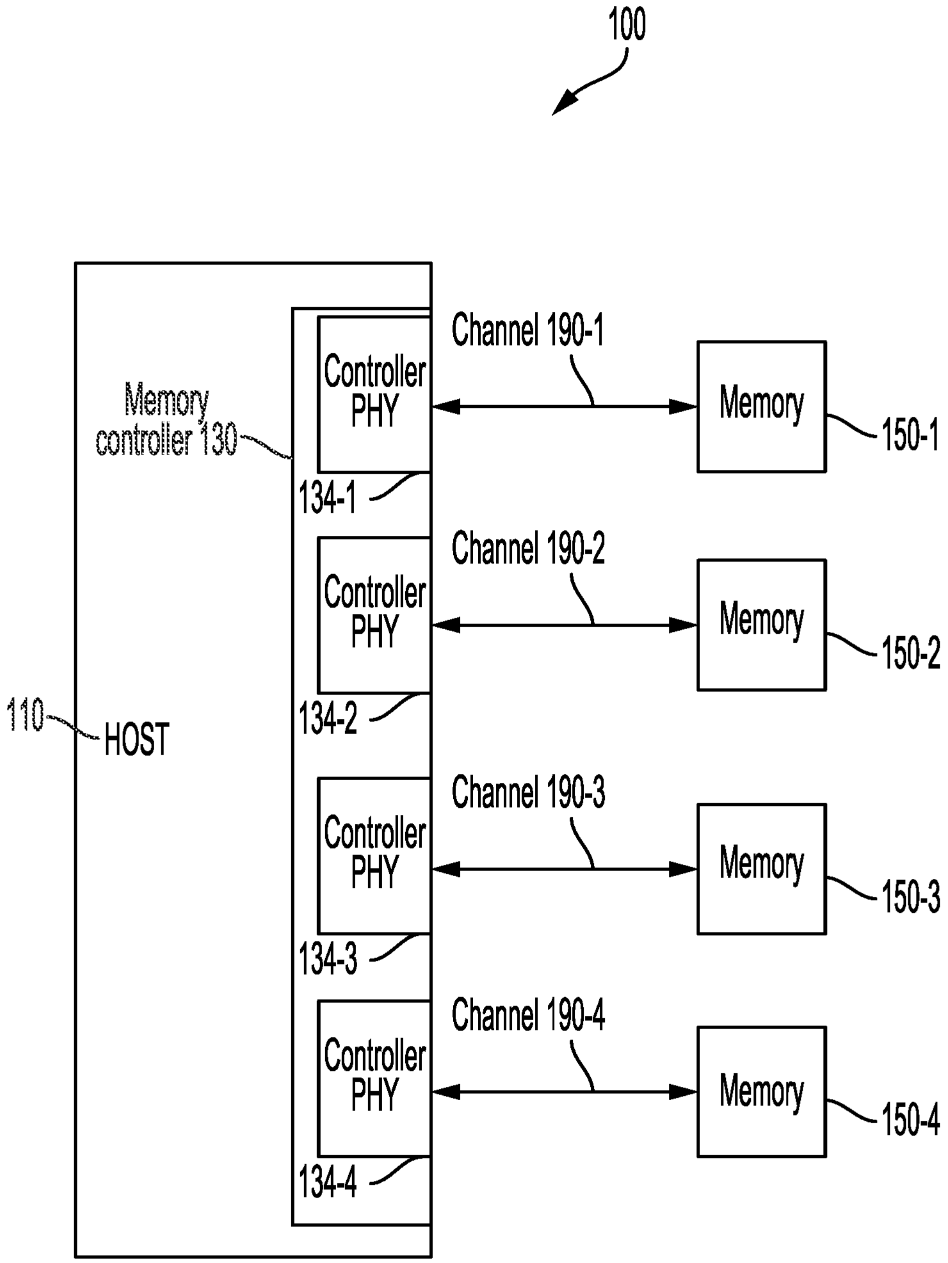
FIG. 1 shows a block diagram of an example computing system incorporating a host, memory system, and channels coupling the host and the memory system according to one or more aspects of the disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support data processing, including techniques for a selective row refresh technique that allows a refresh operation to maintain the information stored in specific rows of the memory cells. The selective refresh technique may be performed by activating only the identified subset of rows for refresh to reduce the time of a refresh cycle and reduce power consumption by the refresh cycle. In different embodiments, the rows for refresh may be selected by a hashing filter including, for example, a Bloom filter, a Cuckoo filter, linear probing, and/or XOR filters. A filter value may be determined by identifying rows with information to retain. The refresh operation may be performed based on this filter value to identify addresses corresponding to a sequence of rows to refresh during a refresh cycle, while omitting the generating of addresses not identified by the hash filter value during the refresh operation. Redundant refresh operations may thus be skipped for empty rows.

Particular implementations of the subject matter described in this disclosure may be implemented to realize one or more of the following potential advantages or benefits. In some aspects, the present disclosure provides for reduced power consumption by performing refresh operations on a selective row basis, such as compared to all-bank refresh operations or per-bank refresh operations. As the number of rows to be refreshed in one refresh cycle reduces, the refresh overhead time may be reduced by up to or more than 90%. In some embodiments, a selector hardware circuit in the memory system may offload up to 90% of the counter operation, which reduces row selection latency. A frequency of refresh operations may increase at higher operating temperatures. In such a mode of operation, high operating temperatures may cause increased power consumption from more frequency refresh cycles that can be offset by selective row-based refresh using a hash filter value. The reduced refresh operations resulting from selective row-based refresh using, e.g., a hash filter value may also increase longevity of the memory array.

The benefits of lower power consumption may be higher when the memory is less utilized such that less valid rows are refreshed during the row-selective self-refresh operation. Comparison of power $P_{bank}$ (in milliWatts) consumed by a memory bank at several temperatures, current $I_{bank}$ (in milliAmperes) consumed by a memory bank at several temperatures, time to perform refresh, and refresh overhead penalty are compared for a conventional LPDDR4 memory and memory operated with row-selective self-refresh with various memory utilizations in Table 1.

TABLE 1

Example performance evaluation for self-selective row refresh.

| | | Self-Selective Row Refresh | | | | |
|---|---|---|---|---|---|---|
| | LPDDR4 Self-Refresh | 25% Row Usage | 50% Row Usage | 75% Row Usage | 90% Row Usage | Empty Segment |
| $P_{Bank}$ (25° C.) (in mW) | 0.517 | 0.129 | 0.258 | 0.387 | 0.464 | No Power Consumed |
| $P_{Bank}$ (95° C.) (in mW) | 11 | 2.75 | 5.5 | 8.25 | 9.9 | |
| $I_{Bank}$ (at 25° C.) (in mA) | 0.470 | 0.117 | 0.235 | 0.352 | 0.423 | |
| $I_{Bank}$ (at 95° C.) (in mA) | 10.0 | 2.5 | 5.0 | 7.5 | 9.0 | |
| Time for Refresh (in mS) | 0.350 | 0.085 | 0.170 | 0.255 | 0.306 | |
| Refresh Overhead | 0.0106 | 0.002655 | 0.0053 | 0.00795 | 0.00954 | |

An example memory device that may incorporate aspects of this disclosure, including selective row-based refresh based on a hash filter value, is shown in FIG. 1. FIG. 1 illustrates an apparatus 100 incorporating a host 110, memories 150, and channels 190 coupling the host 110 and the memories 150. The apparatus 100 may be, for example, a device among computing systems (e.g., servers, datacenters, desktop computers), mobile computing device (e.g., laptops, cell phones, vehicles, etc.), Internet of Things devices, virtual reality (VR) systems, augmented reality (AR) systems, automobile systems (e.g., driver assistance systems, autonomous driving systems), image capture devices (e.g., stand-alone digital cameras or digital video camcorders, camera-equipped wireless communication device handsets, such as mobile telephones, cellular or satellite radio telephones, personal digital assistants (PDAs), panels or tablets, gaming devices, computing devices such as webcams, video surveillance cameras, or other devices with digital imaging or video capabilities), and/or multimedia systems (e.g., televisions, disc players, streaming devices).

The host 110 may include at least one processor, such as central processing unit (CPU), graphic processing unit (GPU), digital signal processor (DSP), multimedia engine, and/or neural processing unit (NPU). The host 110 may be configured to couple and to communicate to the memories 150 (e.g., memories 150-1 to 150-4), via channels 190 (e.g., channels 190-1 to 190-4), in performing the computing functions, such as one of data processing, data communication, graphic display, camera, AR or VR rendering, image processing, neural processing, etc. For example, the memories 150-1 to 150-4 may store instructions or data for the host to perform the computing functions.

The host 110 may include a memory controller 130, which may include controller PHY modules 134-1 to 134-4. Each of the controller PHY modules 134-1 to 134-4 may be coupled to a respective one of the memories 150-1 to 150-4 via respective channels 190-1 to 190-4. For case of reference, read and write are referenced from a perspective of the host 110. For example, in a read operation, the host 110 may receive via one or more of the channels 190-1-190-4 data stored from one or more of the memories 150-1 to 150-4. In a write operation, the host 110 may provide via one or more of the channels 190-1-190-4 data to be written into one or more of the memories 150-1-150-4 for storage. The memory controller 130 may be configured to control various aspects, such as logic layers, of communications to and from the memories 150-1-150-4. The controller PHY modules 134-1-134-4 may be configured to control electrical characteristics (e.g., voltage levels, phase, delays, frequencies, etc.) of signals provided or received on the channels 190-1-190-4, respectively.

In some examples, the memories 150-1-150-4 may be LPDDR DRAM (e.g., LPDDR5, LPDDR6). In some examples, the memories 150-1-150-4 may be different kinds of memory, such as one LPDDR5, one LPDDR6, one Flash memory, and one SRAM, respectively. The host 110, the memories 150-1-150-4, and/or the channels 190-1-190-4 may operate according to an LPDDR (e.g., LPDDR5, LPDDR6) specification. In some examples, each of the channels 190-1-190-4 may include 16 bits of data (e.g., 16 DQs). In some examples, each of the channels 190-1-190-4 may operate on 32 bits of data (e.g., 32 DQs). In FIG. 1, four channels are shown, however the apparatus 100 may include more or less channels, such as 8 or 16 channels.

Figure 2:
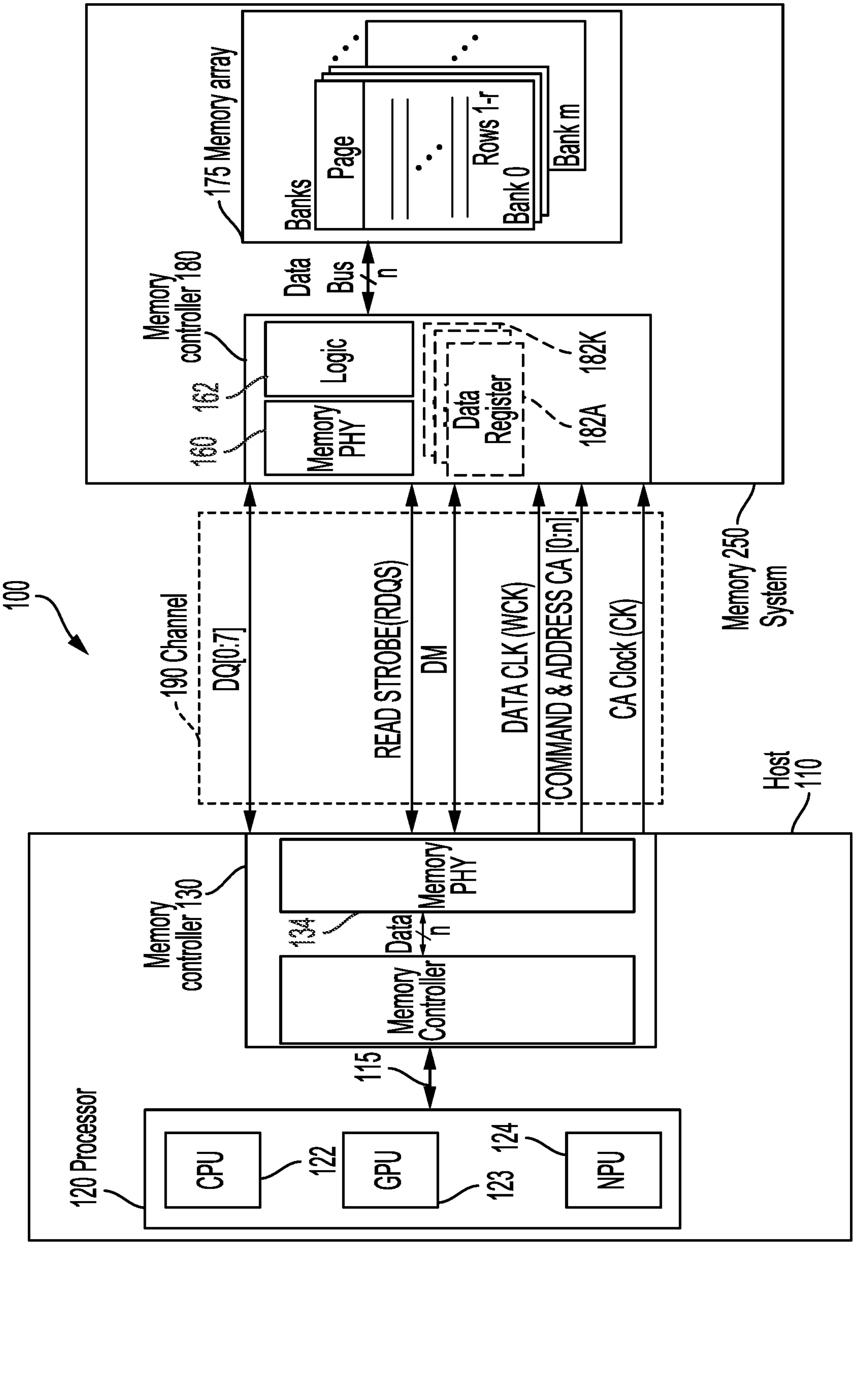
FIG. 2 shows a block diagram of an example computing system incorporating a host, memory system, and channels coupling the host and the memory system with another implementation of the channels according to one or more aspects of the disclosure.

Additional details of an aspect of the embodiment of the apparatus 100 for providing access to a memory system (such as one of memories 150-1-150-4 including logic and control circuit) are shown in FIG. 2. FIG. 2 illustrates a configuration of the host 110, a memory system 250, and the channel 190 according to some aspects of the disclosure with greater specificity. FIG. 2 illustrates another representation of the apparatus 100 having the host 110, the memory system 250, and the channel 190 of FIG. 1. The channel 190 between host 110 and the memory system 250 may include a plurality of connections, some of which carry data (e.g., user data or application data) and some of which carry non-data (e.g., addresses and other signaling information). For example, non-data connections in channel 190 may include a data clock (e.g., WCK) used in providing data to the respective memory system 250 and a read data strobe (e.g., RDQS) used in receiving data from the respective memory system 250, on a per byte basis. The channel 190 may further include a data mask (e.g., DM, sometimes referred to as data mask inversion DMI to indicate multiple functions performed by the signal connection) signaling used to mask certain part of data in a write operation. The channel 190 may further include command and address (e.g., CA[0:n]) and associated CA clock to provide commands (e.g., read or write commands) to the memory system 250.

The host 110 may include at least one processor 120, which may include a CPU 122, a GPU 123, and/or an NPU 124. The host 110 may further include a memory controller 130 having a controller PHY module 134. The memory controller 130 may couple to the at least one processor 120 via a bus system 115 in performing the various computing functions. The term "bus system" may provide that elements coupled to the "bus system" may exchange information therebetween, directly or indirectly. In different embodiments, the "bus system" may encompass multiple physical connections as well as intervening stages such as buffers, latches, registers, etc. A module may be implemented in hardware, software, or a combination of hardware and software.

The memory controller 130 may send and/or receive blocks of data to and/or from other modules, such as the at least one processor 120 and/or the memory system 250. The memory system 250 may include a memory controller 180 with a memory I/O module (e.g., a PHY layer 160) configured to control electrical characteristics (e.g., voltage levels, phase, delays, frequencies, etc.) to provide or to receive signals on connections of the channel 190. For example, PHY layer 160 may be configured to capture (e.g., to sample) data, commands, and addresses from the host 110 via the channel 190 and to output data to the host 110 via the channel 190. Example techniques for communicating on the channel 190 between the PHY layer 160 and the memory controller 130 are shown in the examples of FIG. 3A, FIG. 3B, FIG. 4A, and FIG. 4B. The memory controller 180 may also include data registers 182A-K configured to store data in transit between the host 110 and a memory array 175 and/or to store configuration settings or other data. The memory controller 180 may further include other logic circuitry 162 for controlling operations within the memory system 250. For example, the logic circuitry 162 may coordinate refresh operations for the memory array 175.

The memory system 250 may further include the memory array 175, which may include multiple memory cells (e.g., DRAM memory cells, MRAM memory cells, SRAM memory cells, Flash memory cells) that store values. The host 110 may read data stored in the memory array 175 and write data into the memory array 175, via the channel 190 and the PHY layer 160. The memory array 175 may be divided into a plurality of banks with each bank organized as a plurality of pages.

Application or user data may be processed by the processor 120 and the memory controller 130 instructed to store and/or retrieve such data from the memory system 250. For example, data may be generated during the execution of an application, such as a spreadsheet program that computes values based on other data. As another example, data may be generated during the execution of an application by receiving user input to, for example, a spreadsheet program. As a further example, data may be generated during the execution of a gaming application, which generates information regarding a representation of a scene rendered by a three-dimensional (3-D) application.

The host 110 is coupled to the memory system 250 via the channel 190, which is illustrated for a byte of data, DQ[0:7]. The channel 190 and signaling between the host 110 and the memory system 250 may be implemented in accordance with the JEDEC DRAM specification (e.g., LPDDR5, LPDDR6). As illustrated, the channel 190 includes signal connections of the DQs, a read data strobe (RDQS), a data mask (DM), a data clock (WCK), command and address (CA[0:n]), and command and address clock (CK). The host 110 may use the read data strobe RDQS to strobe (e.g., to clock) data in a read operation to receive the data on the DQs. The memory system 250 may use the data mask DM to mask certain parts of the data from being written in a write operation. The memory system 250 may use the data clock WCK to sample data on the DQs for a write operation. The memory system 250 may use the command and address clock CK to clock (e.g., to receive) the CAs. A signal connection for each of the signaling may include a pin at the host 110, a pin at the memory system 250, and a conductive trace or traces electrically connecting the pins. The conductive trace or traces may be part of a single integrated circuit (IC) on a silicon chip containing the processor 120 and the memory system 250, may be part of a package on package (POP) containing the processor 120 and the memory system 250, or may be part of a printed circuit board (PCB) coupled to both the processor 120 and the memory system 250.

The memory system 250 may include a PHY layer 160 (e.g., a memory I/O module) configured to control electrical characteristics (e.g., voltage levels, phase, delays, frequencies, etc.) to provide or to receive signals on the channel 190. For example, PHY layer 160 may be configured to capture (e.g., to sample) data, commands, and addresses from the host 110 via the channel 190 and to output data to the host 110 via the channel 190. Information transmitted across the channel 190 may be stored in registers in the PHY layer 160 of the memory system 250 as a temporary or short-term storage location prior to longer-term storage in the memory array 175.

The memory system 250 may further include a memory array 175, which may include multiple memory cells (e.g., DRAM memory cells) that store information. The host 110 may read data stored in the memory array 175 and write data into the memory array 175 via the channel 190. Moreover, the memory array 175 may be configured to store metadata such as ECCs (e.g., system or array ECCs) associated with the stored data.

Operations according to some embodiments of this disclosure for storing and retrieving information from memory array 175 may be performed by controlling signals on individual lines of the channel 190. Example embodiments of signaling for a write operation are shown and described with reference to FIG. 3A and FIG. 3B. Example embodiments of signaling for a read operation are shown and described with reference to FIG. 4A and FIG. 4B.

Figure 3A:
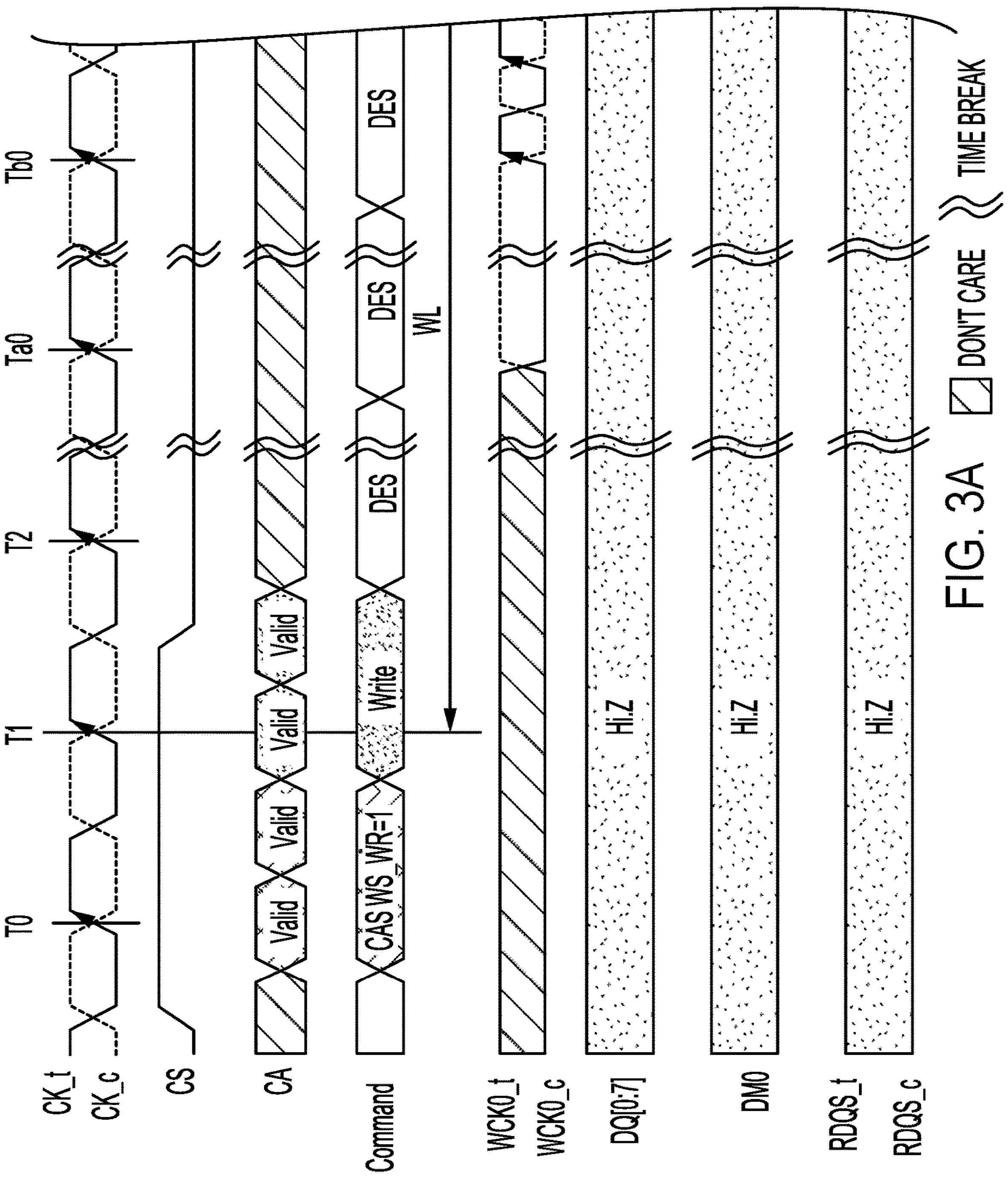
FIG. 3A and FIG. 3B illustrate waveforms of transfer of data through an example channel in a write operation in accordance with certain aspects of the present disclosure.
Figure 3B:
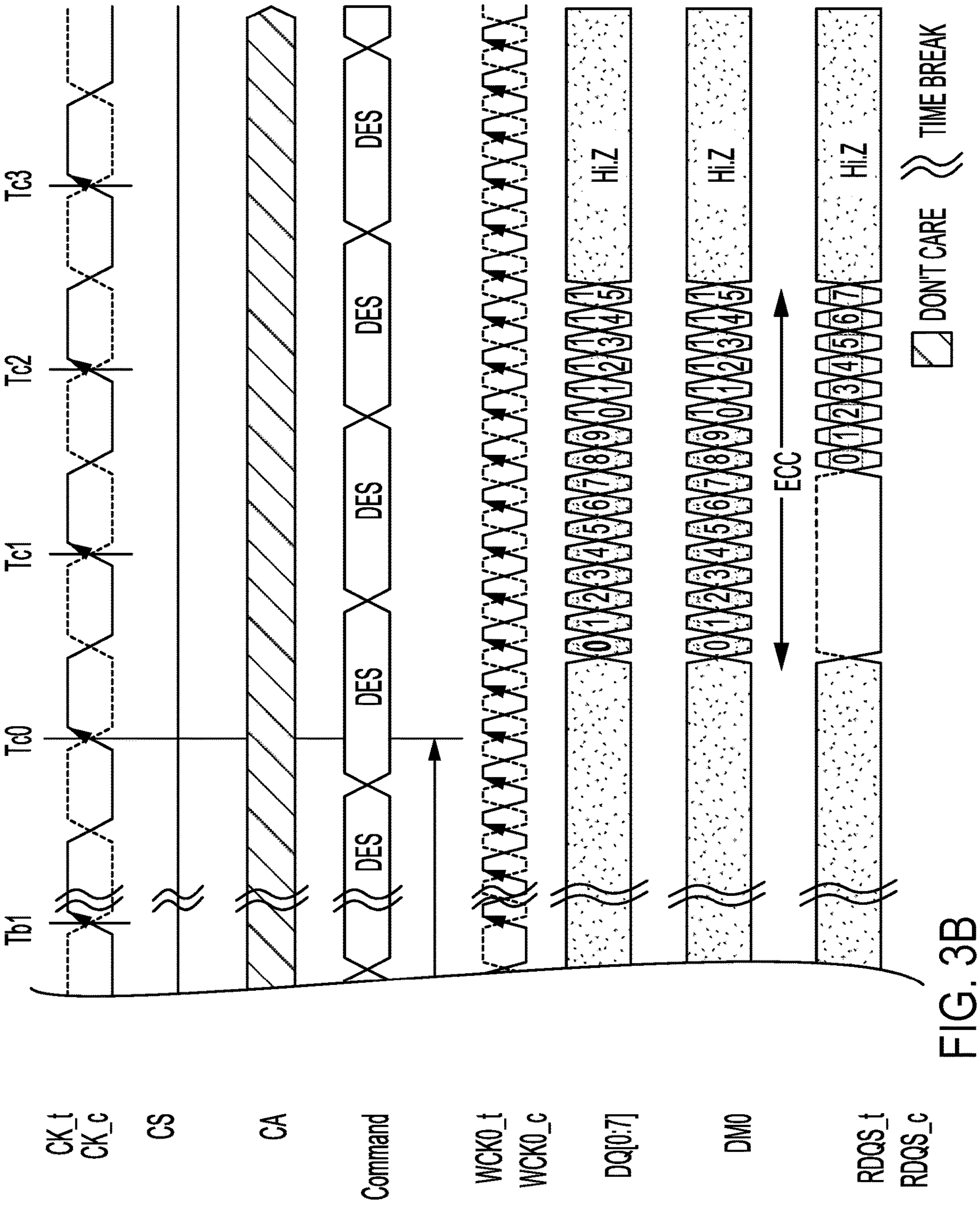

FIG. 3A and FIG. 3B illustrate waveforms of transfer of data through an example channel in a write operation in accordance with certain aspects of the present disclosure. The command and address clock, CK, may be a differential signal having CK_t and CK_c signal connections. The data clock WCK may be a differential signal having WCK0_t and WCK0_c signal connections. The read data strobe RDQS may be a differential signal having RDQS_t and RDQS_c signal connections. The data mask is labeled DM0 to indicate that DM0 corresponds to a lower byte of DQs (DQ[0:7]). At T0 (rising edge of CK_t and falling edge of CK_c), a CAS command may be provided by the host 110 for a write operation to the memory system 250. At T1, a write command may be provided by the host 110 to the memory system 250.

After a time period write latency (WL), the host 110 may toggle the data clock WCK0_t and WCK0_c to provide the memory system 250 with clocking for receiving data for write, on the DQ signal connections. At Tc0-Tc2, the memory system 250 may receive 16 bytes of data serially, on each of the DQ[0:7] signal connections and clocked by the data clock WCK0_t and WCK0_c. The memory system 250 may receive 16 bits of the data mask DM0 serially (e.g., based on the data clock WCK0_t and WCK0_c) to mask certain portions of the received data from the write operation. In some examples, the 16 bytes of data and 16 bits of the data mask DM0 may be received by the memory system 250, with each bit of the data mask DM0 masking a corresponding byte of the received data. At Tc0-Tc2, the RDQS_t signal connection may be a Hi-Z condition. In a read operation, the RDQS_t signal connection may be configured to provide a read data strobe (RDQS) from the memory system 250 to the host 110.

Figure 4A:
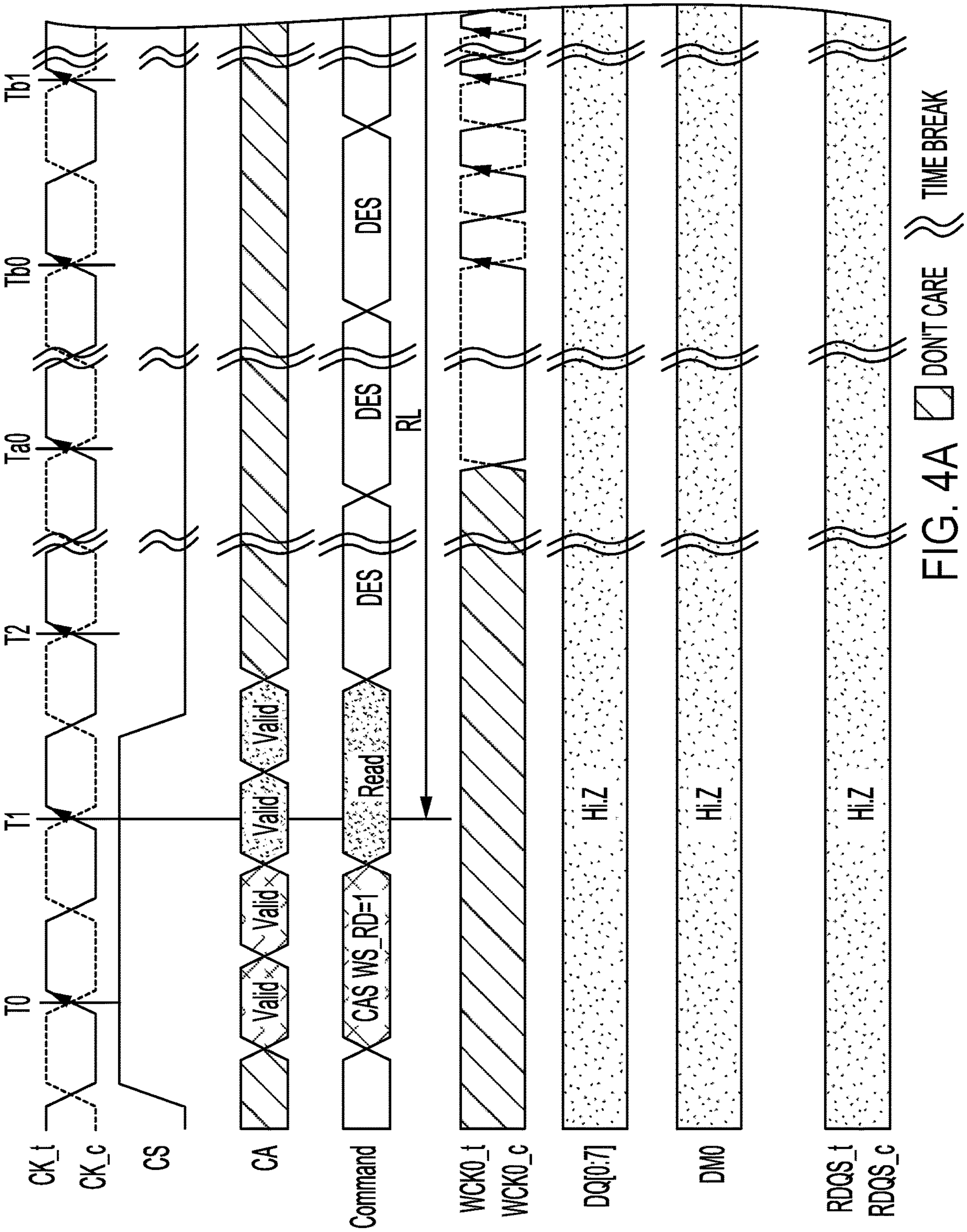
FIG. 4A and FIG. 4B illustrate waveforms for transfer of data through an example channel in a read operation in accordance with certain aspects of the present disclosure.
Figure 4B:
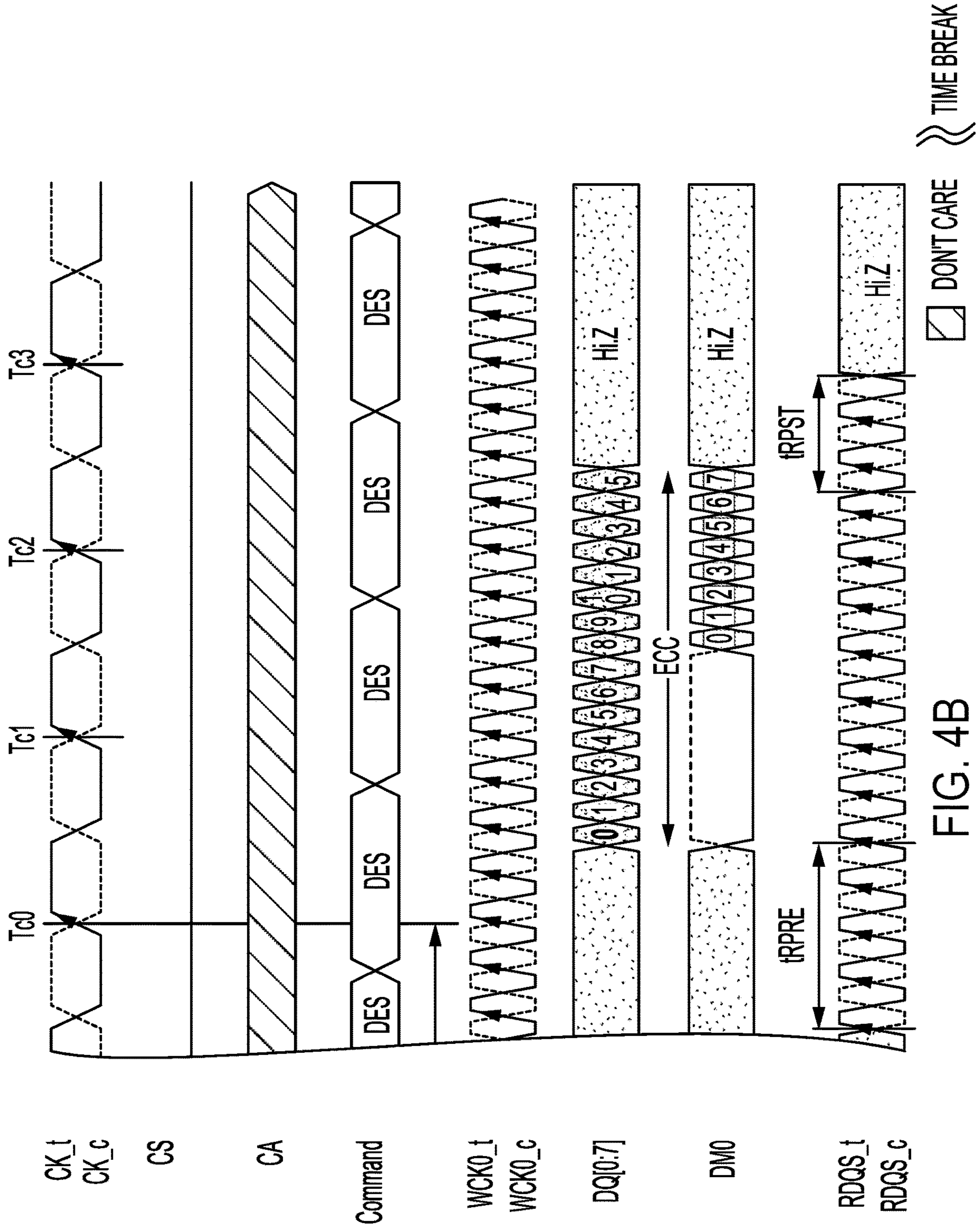

FIG. 4A and FIG. 4B illustrate waveforms for transfer of data through an example channel in a read operation in accordance with certain aspects of the present disclosure. The command and address clock, CK, may be a differential signal having CK_t and CK_c signal connections. The data clock WCK may be a differential signal having WCK0_t and WCK0_c signal connections. The read data strobe RDQS may be a differential signal having RDQS_t and RDQS_c signal connections. The data mask is labeled DM0 to indicate that DM0 corresponds to a lower byte of DQs (DQ[0:7]). At T0 (rising edge of CK_t and falling edge of CK_c), a CAS command may be provided by the host 110 for a read operation to the memory system 250. At T1, a read command may be provided by the host 110 to the memory system 250.

After a time period read latency (RL), the memory system 250 may toggle the read data strobe RDQS to provide the host 110 with clocking to receive data for the read operation on the DQ signal connections. At Tc0-Tc2, the host 110 may receive 16 bytes of data serially, on each of the DQ[0:7] signal connections and clocked by the read data strobe RDQS_t and RDQS_c. Thus, in the example, 16 bytes of data are received by the host 110.

At Tc0-Tc2, the data mask DM0 signal connection may be in a Hi-Z condition. In a write operation, the DM signal connection may be configured to provide a data mask from the host 110 to the memory system 250, which is clocked by WCK0_t and WCK0_c.

Figure 5:
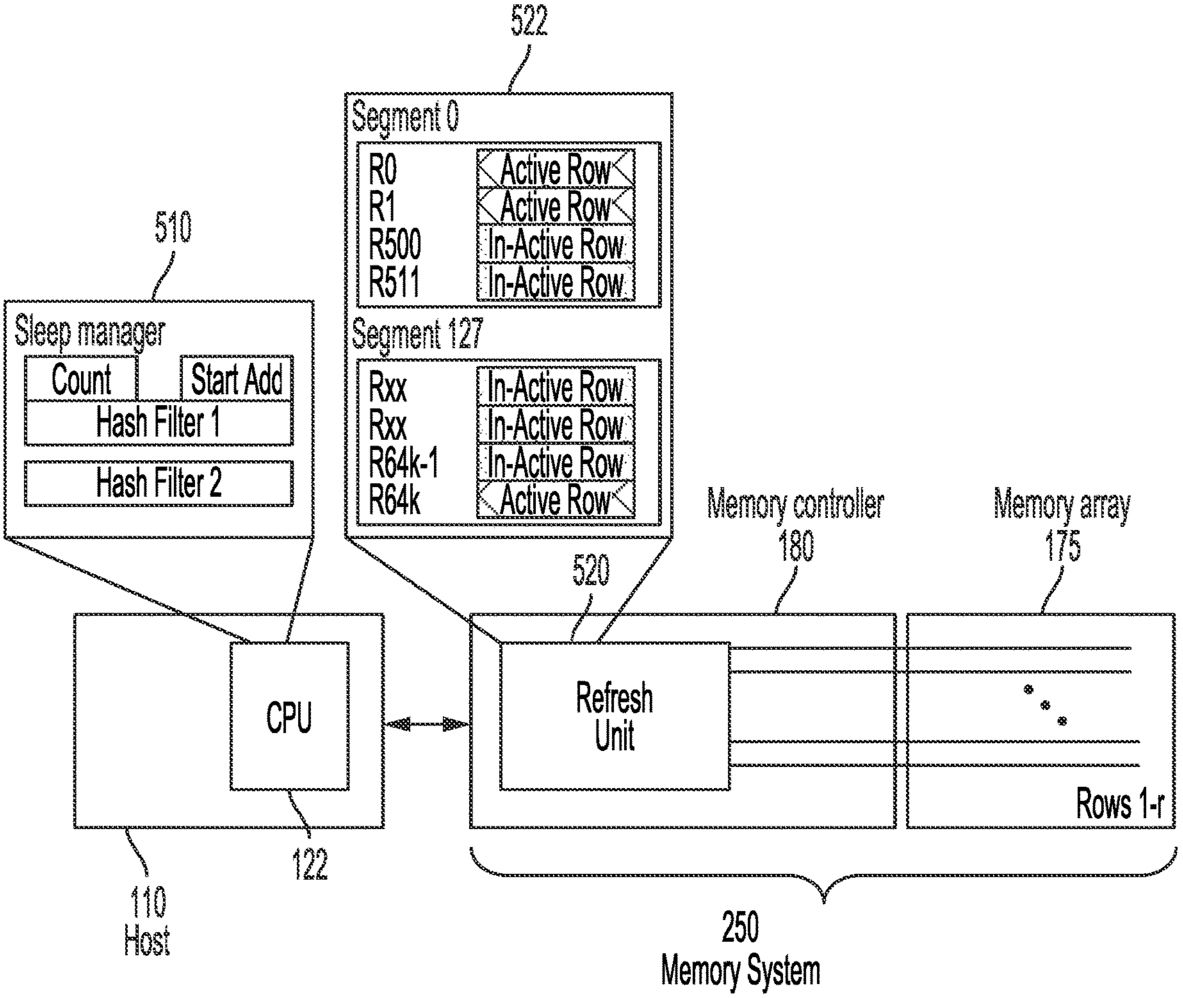
FIG. 5 is a block diagram illustrating aspects of a row selective refresh operation according to some embodiments of the disclosure.

An example refresh operation according to embodiments of the disclosure for the memory array 175 of memory system 250 is shown in FIG. 5. FIG. 5 is a block diagram illustrating aspects of a row selective refresh operation according to some embodiments of the disclosure. The memory array 175 of the memory system 250 may be organized with a plurality of rows, with each row having a corresponding address. Each of the rows may have a plurality of memory cells with each memory cell assigned to separate columns. The memory controller 180 may be configured to perform refresh operations on the memory array 175 on a row-by-row basis. Conventionally, this includes cycling through each row of the plurality of rows and refreshing the information stored in that row. The memory array 175 may not be completely filled with data. Thus, refreshing every row may result in unnecessarily refreshing rows that do not store information and thus wasting power.

The memory controller 180 may include a refresh unit 520 configured to perform at least some refresh operations for the memory array 175. For example, the refresh unit 520 may be configured to perform selective-row refresh within the memory array 175. The selective refresh may be based on a table 522 stored in the memory controller 180. The table 522 may indicate row addresses and a corresponding indicator as to whether the row stores valid data (an active row) or does not store valid data (an inactive row). The table 522 may be populated by obtaining a hash filter, such as by receiving a hash filter from the host 110 and/or accessing a memory location corresponding to the hash filter. In some embodiments, no table is stored in the refresh unit 520 and instead the hash filter is stored in the refresh unit 520 and decoded to perform refresh operations.

The CPU 122 of the host 110 may execute a sleep manager 510 that tracks a count of a number of active rows in memory, a start address corresponding to the first active row in memory, and a hash filter indicating active rows in the memory. In some embodiments, the sleep manager 510 may execute as a kernel-level process in an operating system executing on the CPU 122. In some embodiments, the sleep manager 510 may execute in firmware on hardware circuitry within the host 110.

One or more hash filters may be stored by the sleep manager 510, with each hash filter indicating active rows for a different portion of the memory array 175. For example, a hash filter may be stored for each bank of the memory array 175 although other organizations are possible. Example hash filters for tracking active rows in memory array 175 include a Bloom filter, a Cuckoo filter, a linear probing filter, and a XOR filter.

One example of a hash filter for tracking active rows is a Bloom filter, which is a space-efficient probabilistic data structure that is used to test whether an element (e.g., a particular row) is a member of a set (e.g., the subset of active rows in the memory array 175). Tracking active rows in the memory array 175 may include starting with an empty Bloom filter, which is a bit array of m bits with all set to zero. A number k of hash functions may be used to calculate the hashes for a given input (e.g., the row value corresponding to a row containing active data). When a row is indicated as active, such as having been previously the subject of a write operation, the indices are added as an item in the filter by setting the bits at k indices $h_1(x)$, $h_2(x)$, . . . $h_k(x)$, where the indices are calculated using hash functions $h_k$ with the row value as an input. The Bloom filter may be provided to the memory system 250 by the host 110. The memory controller 180 may perform a reverse set of operations applied to determine active rows from the Bloom filter. For example, for each row value hashes using $h_1$, $h_2$, . . . $h_k$ may be calculated and the hash filter checked to determine if all corresponding indices in the Bloom filter are set to '1' in the bit array. Example hash functions for $h_1$, $h_2$, . . . $h_k$ include murmur, FNV series, and Jenkins hashes.

In some embodiments using a hash filter, the indexes of the filter may be filled with the row address (referring to the encoded address, rather than the entire address). The row addresses for refresh may be assigned a count value indicating a sequence of row addresses for refresh during the memory's self-refresh operation. In some embodiments, the hash filter is constructed with the row addresses corresponding to active rows with stored data are sorted sequentially and each row address assigned a sequential count value (e.g., row address 02 assigned count 0, row address 07 assigned count 1, row address 1A assigned count 2). The count value is used to avoid the need during a selective row refresh of testing the hash filter for every row address in the memory array. If there are 40 row addresses out of 512 to refresh, count values 0-39 are assigned to the 40 row addresses such that the counter in the memory system may step through the 0-39 to active the 40 row addresses sequentially (without deactivating the row select enable signal) and end the self-refresh operation after refreshing 40 rows. The count value indicating may be appended to the row address. For example, if a row address is 0xAh (binary 1010) and the count is 2 in decimal or (binary 10), then the hash filter index for that row would save binary value 101010. During refresh operation on the memory device, the first four bits, which would carry the row address information, are added to the start address, and the last two bits are compared with the counter value to determine a row refresh.

Another example of a hash filter for tracking active rows is a XOR filter. The XOR filter operates similar to the Bloom filter described above, but the bits are grouped together into L-bit sequences.

A further example of a hash filter for tracking active rows is a Cuckoo filter, which is a minimized hash table that uses cuckoo hashing to resolve collisions. The Cuckoo filter may be operated similarly to that of the XOR and Bloom filters described above to track active rows as a fingerprint stored in the set of bits. The cuckoo filter may have an array of buckets, with the buckets assigned to track different portions of the memory array 175.

Yet another example of a hash filter for tracking active rows is a linear probing filter. With linear probing, each cell of a hash table stores a single key-value pair. In one embodiment of linear probing, the row address information (e.g., difference between the start row address and the current row address) is appended to the count value and stored in a linear fashion.

The CPU 122 may be configured to detect a triggering event for activating selective row refresh memory mode. The triggering event may be based on a counter that determines that the host 110 has been in a low power mode (e.g., sleep mode) for a predetermined amount of time. The triggering event may be based on the host 110 being in a location that indicates that the host 110 may be in a sleep mode for an extended period of time. Such a location may be, for example when the host 110 is an automobile, a parking garage at an airport. The triggering event may be a user input in which the user indicates that the host 110 should enter sleep mode, such as by depressing a power button.

For example, if the host 110 is integrated into an automobile, the CPU 122 may determine from the location data that the host 110 is located in a parking garage or in a car rental lot, which indicates that the host 110 will not be in use for an extended period of time. Accordingly, once the CPU 122 determines that the host 110 is in the parking garage or the car rental lot, the CPU 122 may transmit the hash filter to the memory system 250 and cause the memory system 250 to enter into the selective row refresh memory mode.

Figure 6:
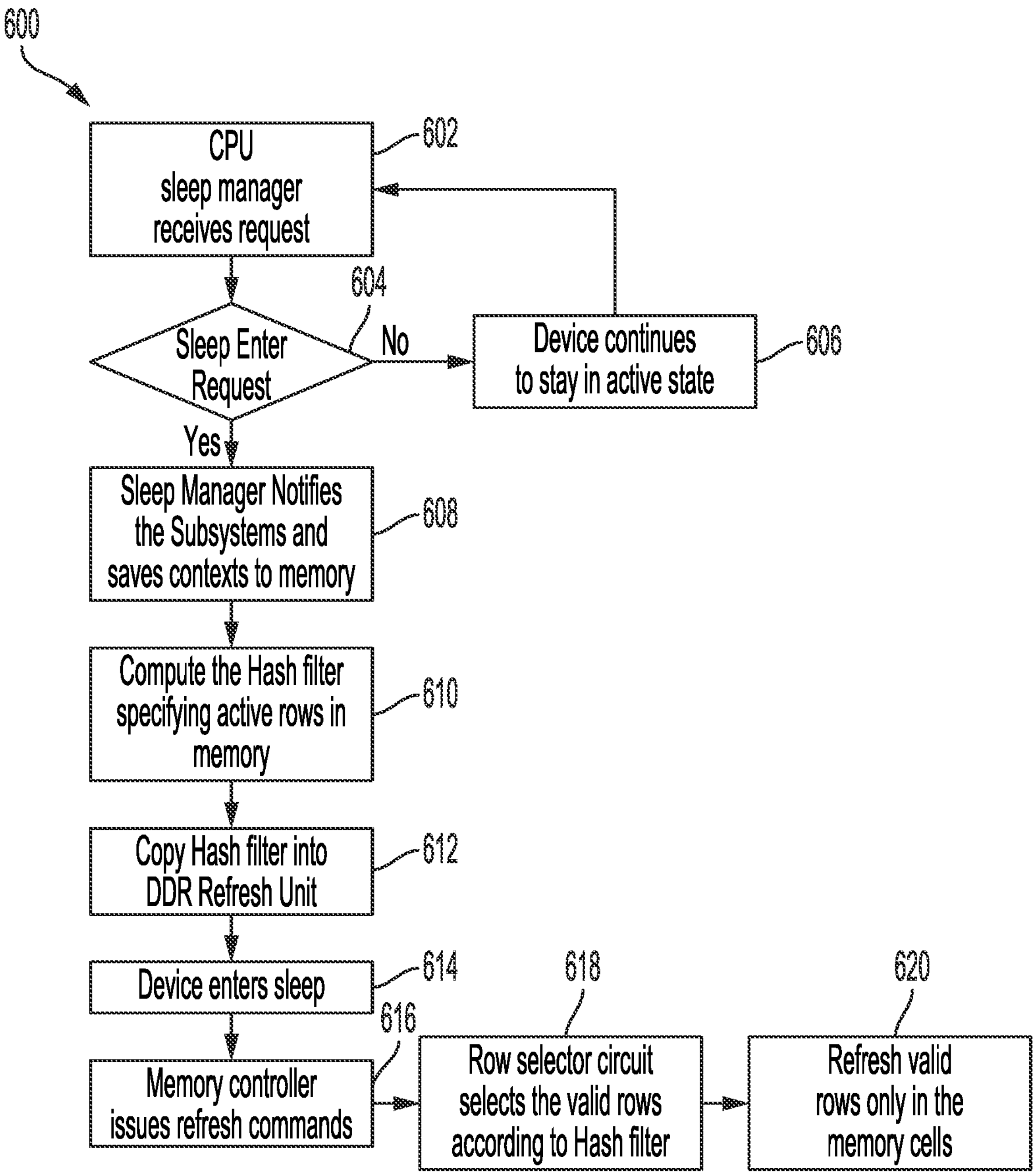
FIG. 6 is an example flow chart illustrating execution of selective row refresh in sleep mode according to some embodiments of the disclosure.

The memory system 250 may be configured for selective row refresh operation by the processor based on a power state of the processor. FIG. 6 is an example flow chart illustrating execution of selective row refresh in sleep mode according to some embodiments of the disclosure. A method 600 begins, at block 602 with the sleep manager receiving a request. At block 604, the request is determined to be a sleep request or other request. If the request is not for sleep mode then the method 600 keeps the device in a present, active state at block 606 and continues processing requests at block 602.

When the request is identified as a sleep request, the method 600 proceeds to block 608 to notify subsystems of the computing device, such as other user-level and kernel-level applications or other hardware management circuitry, of the sleep request so that other processes can save contexts to memory. As the contexts are written to memory, the sleep manager tracks the location of data in memory based on the addresses of the write commands used to save the context data to memory. At block 610, the sleep manager may compute a hash table based on the locations of the context data. For example, the sleep manager may compute a hash for an address corresponding to each segment of context data written to memory and the output of that hash used to build a hash filter, such as a Bloom filter. After certain criteria have been met to enter sleep mode, the method 600 may proceed to block 612 to copy the hash filter to the memory system. The criteria may be, for example, a predetermined amount of time passing since the notification of block 608 or the receipt of request a block 602 or receipt of confirmation from all processes that context data is written to memory.

After copying the hash filter to the memory system, the processor may enter sleep mode at block 614. When sleep mode is entered, an instruction may be sent to the memory controller to enter a refresh mode applicable during the sleep mode. For example, a self-refresh command may be sent to the memory system. In some embodiments, the instruction may include an indication that row-selective refresh should be performed based on the hash filter transmitted at block 612. In some embodiments, the instruction may be specific for a row-selective self-refresh mode. While in sleep mode, the memory controller issues refresh commands to the memory array of the memory system at block 616 to maintain the contents of the memory (e.g., the context data). The refresh commands may be from either the memory controller on the host device or the memory controller on the memory system. The refresh command causes a row-selector circuit at block 618 to select a subset of rows in the memory array for refresh based on the contents of the hash filter. At block 620, rows that are selected at block 618 are refreshed.

Figure 7:
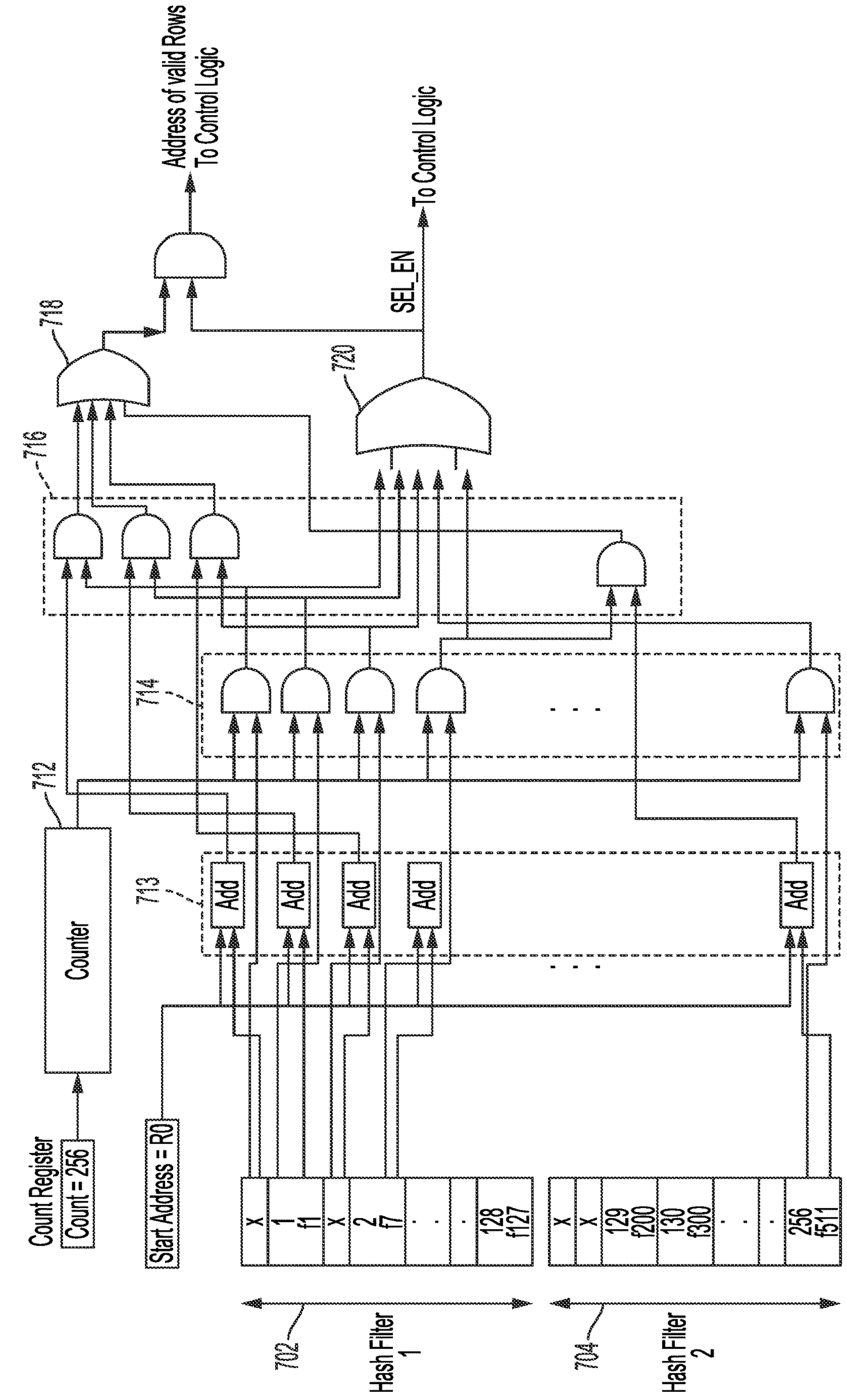
FIG. 7 is a block diagram illustrating the generation of row selection signals to perform selective-row refreshes according to some embodiments of the disclosure.

An example row-selective refresh operation is shown in FIG. 7. FIG. 7 is a block diagram illustrating the generation of row selection signals to perform selective-row refreshes according to some embodiments of the disclosure. One or more hash filters 702 and 704 may store indications corresponding to valid rows of the memory array. For example, hash filter 702 may include an empty cell corresponding to array location 0 and an entry corresponding to a valid row to be refreshed at array location 1. Array location 1 may include a value '1' accompanied by value 'f1' indicating that when the refresh counter is at value 1 the row at address 'f1' should be refreshed. Other example values from the hash filter 702 are shown, such as an indicator that when the refresh counter is at value 2 the row at address 'f7' should be refreshed. The rows for refresh may be indicated across multiple hash filters (e.g., hash filter 702 and hash filter 704). In some embodiments, the different hash filters may correspond to different segments, banks, or dies in the memory array 175.

Row signals for refreshing individual rows of the memory array may be generated based on the hash filter 702 using a counter. The counter increments through count values from 1 to a number of elements in the hash filter. As the counter value progresses from the value '1' to subsequent values up to the number of elements a row address is retrieved from the hash filter 702 and used to refresh a row of the memory array corresponding to the row address indicated by the entry in the hash filter 702. Logic circuitry, such as in the example embodiment of FIG. 7, may be used to generate the row select signals. Each of the adders 713 generate address values by adding the row addresses of the hash filter 702 to a predetermined starting address. Each of the adders 713 is thus continuously outputting row addresses corresponding to rows that should be refreshed. Gates 714 which compare the count from counter 712 to the count value of each entry in the hash filter 702 and hash filter 704. The operation of gates 714 and gates 716 is to select one of the row addresses output from adders 713 for refresh. As the count value increments, a next row address output from adders 713 is selected for refresh. The gates 714 perform an AND operation to select the hash filter 702 entry index value that matches a particular count value. The gates 716 perform an AND operation to select a row address that has a count value corresponding to the output of the counter 712. Mux 718 performs an OR operation to combine the output of the selected row address with the unselected row address, such that the selected row address is passed to the memory array for refresh. Mux 720 performs an OR operation to combine the output of the AND operation on the count value in gates 714 such that an enable signal is passed to the memory array for refresh to indicate when a valid row address is matched in the hash filter 702 with the count value.

A more specific example operation in FIG. 7 is now described. The generation of row signals from the hash filter 702 and hash filter 704 are shown using logic including adders 713, gates 714, gates 716, mux 718, and mux 720. A counter 712 may output sequential values from zero to the maximum count value determined, for example, by sleep manager 510 and stored in a count register of the memory system 250. A count value, which is the sequential output of counter 712, is output to gates 714, which compare the count to the count value of each entry in the hash filter 702 and hash filter 704. When a match occurs, a signal is output by the corresponding gate to gates 716. The corresponding one of gates 716 is activated, which passes the output of adders 713 combining the starting address with the memory address from the corresponding location of the hash filter 702 or hash filter 704. The address is then passed through mux 718 to refresh control logic to perform the refresh on the indicated row. The mux 720 combines the outputs of gates 714 such that if at least one of the signals from the gates 714 indicates a match between the counter value and the hash filter 702 of hash filter 704 then the enable signal SEL_EN is triggered indicating to the refresh control logic to continue to perform refresh operations. When there is no match between the counter value and the hash filter 702 or hash filter 704, the enable signal SEL_EN switches off to indicate that no refresh operation should be performed for that counter value. The normal operation is for the enable signal during a row-selective refresh operation is to remain active while the selected rows are refreshed and then deactivated until a new refresh cycle begins.

Figure 8:
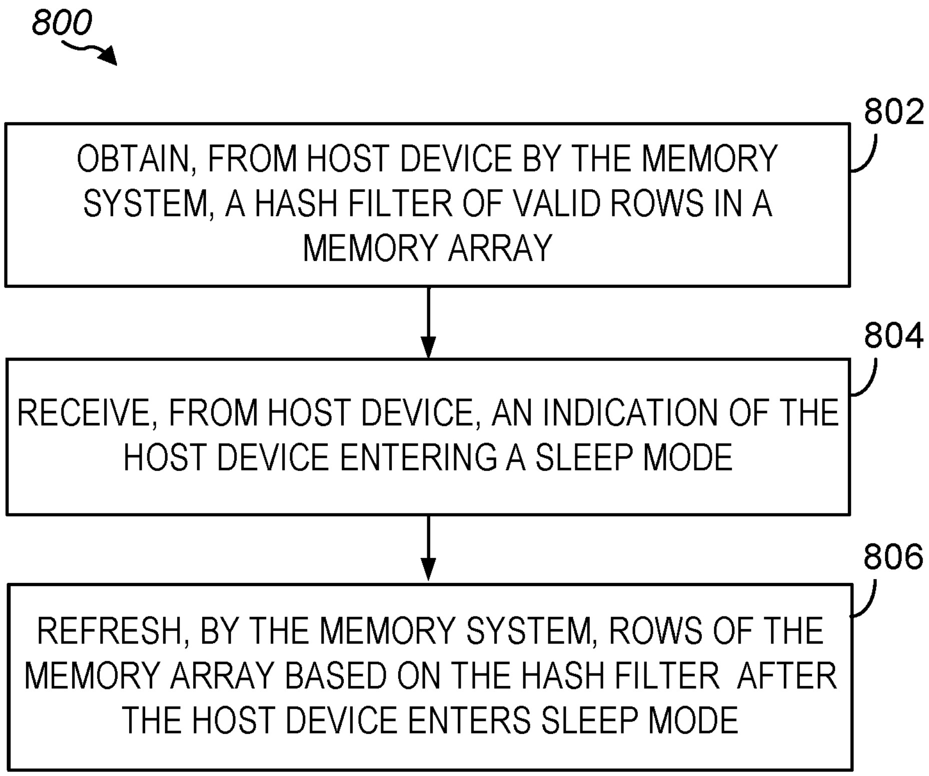
FIG. 8 is a flow chart illustrating performing row-selective refresh operations by a memory system according to some embodiments of the disclosure.

An example method is shown in FIG. 8. FIG. 8 is a flow chart illustrating performing row-selective refresh operations by a memory system according to some embodiments of the disclosure. A method 800 begins, at block 802, with obtaining (e.g., by receiving) from the host device a hash filter indicating valid rows in a memory array. The hash filter may be received by the memory controller 180 of the memory system 250 through channel 190 from the memory controller 130 of the host 110. The hash filter may be received as part of a command transmitted on the COMMAND & ADDRESS CA bus of channel 190. The hash filter may alternatively be received as part of data transmitted on the DQ bus of channel 190.

At block 804, the memory system receives an indication that the host device is entering a sleep mode. The indication causes the memory controller 180 to assume responsibility for refreshing the memory array 175 without further input from the host 110 until a new instruction changing the refresh mode is received. The indication that the host 110 is entering sleep mode may take the format of an instruction for the memory system 250 to enter a certain sleep mode that allows the host 110 to enter sleep mode.

In some embodiments, the operations of block 802 and block 804 may be performed by a single operation. For example, a command to initiate a row-selective self-refresh operation may include the hash filter. As another example, an indication that the host 110 is entering sleep mode may include the hash filter. The use of a single command that conveys the self-refresh instruction and the hash filter may be advantageous in reducing clock cycles of the channel 190 occupied with overhead information.

At block 806, the memory system performs refresh of selective rows of the memory array based on the hash filter. The refresh may be performed by logic circuitry 162 in memory controller 180, such as a refresh unit 520 of FIG. 5 that generates control signals (e.g., row selection and enable signal) as described in FIG. 7.

Figure 9:
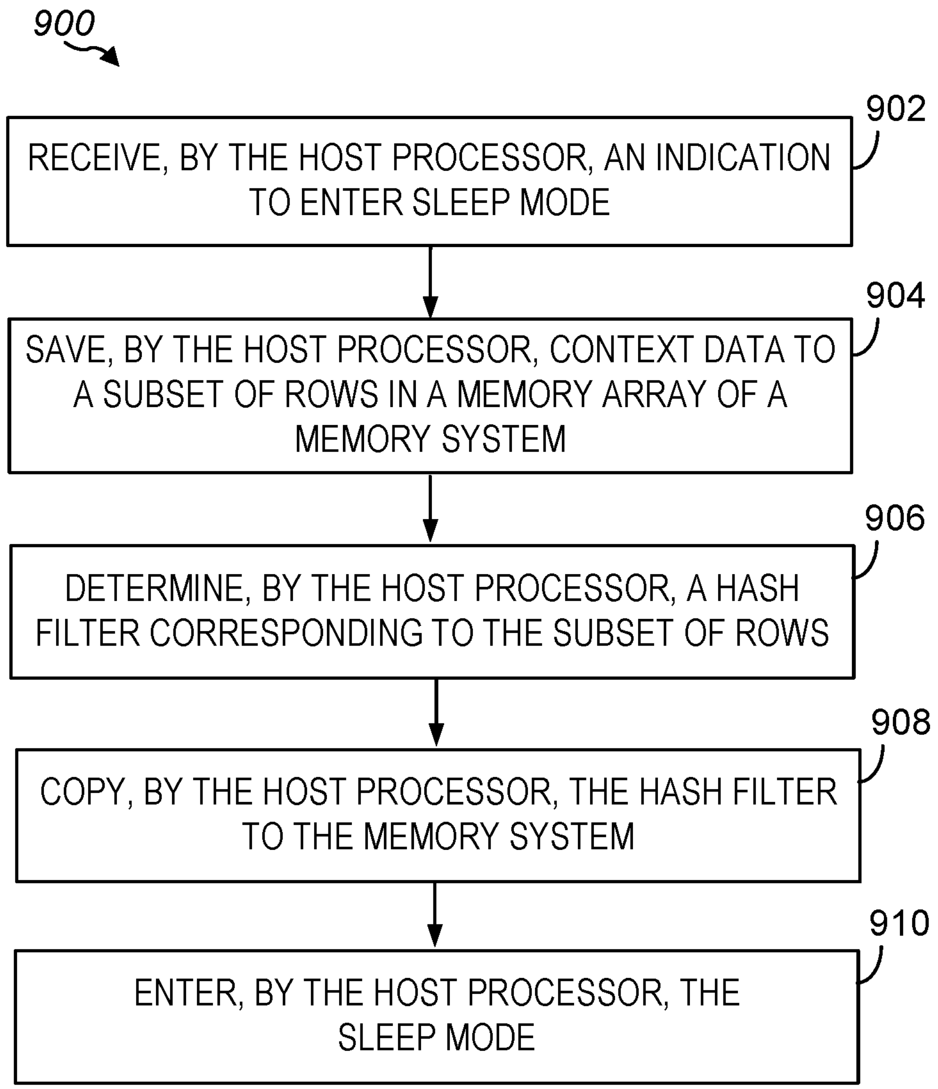
FIG. 9 is a flow chart illustrating a host device operating a memory system to perform row-selective self-refresh according to one or more aspects of the disclosure.

A host device may configure the memory system for performing the self-refresh operation of FIG. 8. FIG. 9 is a flow chart illustrating a host device operating a memory system to perform row-selective self-refresh according to one or more aspects of the disclosure. A method 900 begins at block 902 with the host processor receiving an indication to enter sleep mode. The indication may be triggered by information such as a location of the host device, a processing queue of the host device, user input specifying a low-power mode for the host device, and/or a lack of user input to the host device in a predetermined period of time. Although some examples of sleep mode are described, sleep mode may refer to any lower-power state of operation during which the memory system will not be accessed by the host device for a period of time.

At block 904, the host processor saves context data to a subset of rows in a memory array of a memory system. The context data may include application data, user data, register values from a processor core, or the like that indicates a current state of processing by the host device.

At block 906, the host processor determines a hash filter corresponding to the subset of rows storing data at block 904. In some embodiments, a table or other data structure of valid locations may be maintained while saving the context data at block 904 and a hash filter built from the table or other data structure after the context data is saved. In some embodiments, a hash filter is updated as context data is stored into the memory array. For example, first context data may be stored from a first application executing on the host processor to the memory system at a first row address. Then, the first row address is hashed, such as described above regarding a Bloom filter or a Cuckoo filter, and the hash filter updated based on the hash values. Subsequently, second context data may be stored from a second application executing on the host processor to the memory system at a second row address. Then, the second row address is hashed and the hash filter updated based on the hash values. The process may be repeat for additional context data from additional applications until all context data is saved to the memory system.

At block 908, the host processor copies the hash filter to the memory system. The copy may include storing the hash filter at a particular location in the memory or attaching the hash filter as a data value to a command sent to the memory system, such as a command to update a configuration register or change a mode of the memory system. In some embodiments, block 908 may involve the host processor transmitting a self-refresh command with the hash filter attached or a row-selective self-refresh command with the hash filter attached. In some embodiments, block 908 may involve the host processor transmitting a self-refresh command with an address in the memory array to the hash filter to use during the self-refresh operation.

At block 910, the host processor enters sleep mode. During sleep mode the host processor may rely on the memory system to perform self-refresh operations without input from the host processor. While in sleep mode, the power consumed by the host device is reduced by reduction of the operating system of the host processor a lower voltage, lower frequency, deeper sleep state, and/or power-gating portions or all of the host processor. The host processor may later receive a trigger to exit the sleep mode. When exiting from sleep mode, the host processor may transmit a command to the memory system to exit the row-selective self-refresh mode of operation for the host processor to resume handling refresh operations.

A wireless communications device may include a memory system as illustrated in at least FIG. 1 and FIG. 2 and configured to receive and output data from the memory array and perform refresh operations on the memory array. The memory system according to any of the aspects disclosed herein, may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, or avionics systems.

In one or more aspects, techniques for memory storage and retrieval may include additional aspects, such as any single aspect or any combination of aspects described below or in connection with one or more other processes or devices described elsewhere herein. In a first aspect, supporting data operations may include an apparatus comprising a memory controller coupled to a memory array through a first bus and configured to access data stored in a memory array through the first bus, the memory controller configured to couple to a host device through a channel. The apparatus, such as through the memory controller, may be configured for receiving, from the host device through the channel, a hash filter indicating a first subset of rows in the memory array; and refreshing, by the memory controller, a second subset of rows in the memory array based on the hash filter.

Additionally, the apparatus may perform or operate according to one or more aspects as described below. In some implementations, the apparatus includes a wireless device, such as a UE. In some implementations, the apparatus includes a remote server, such as a cloud-based computing solution, which receives image data for processing to determine output image frames. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, the hash filter indicates valid rows of the memory array as the first subset of rows. In some aspects, the refreshing is performed only on the first subset of rows in the memory array based on the hash filter, such that the second subset of rows is the first subset of rows.

In a third aspect, in combination with one or more of the first aspect or the second aspect, the hash filter comprises at least one of a Bloom filter, a Cuckoo filter, a linear probing filter, or a XOR filter.

In a fourth aspect, in combination with one or more of the first aspect through the third aspect, the apparatus is further configured for receiving, from the host device, an indication to enter self-refresh mode, wherein after receiving the indication to enter the self-refresh mode, the memory controller performs refreshing of the second subset of rows based on the hash filter.

In a fifth aspect, in combination with one or more of the first aspect through the fourth aspect, the hash filter is received as part of the indication to enter the self-refresh mode.

In a sixth aspect, in combination with one or more of the first aspect through the fifth aspect, receiving the indication to enter the self-refresh mode comprises receiving an indication of the host device entering a sleep mode.

In a seventh aspect, in combination with one or more of the first aspect through the sixth aspect, refreshing the second subset of rows comprises refreshing only the first subset of rows in the memory array.

In an eighth aspect, in combination with one or more of the first aspect through the seventh aspect, refreshing the second subset of rows based on the hash filter comprises: incrementing a counter from a starting value to a count value; and for each value of the counter: determining a row address corresponding to a counter value based on the hash filter; and refreshing the memory array at the row address.

In a ninth aspect, in combination with one or more of the first aspect through the eighth aspect, determining the row address comprises adding a value from the hash filter with a starting address, and the row address and the count value are received from the host device.

In a tenth aspect, in combination with one or more of the first aspect through the ninth aspect, the memory controller is configured to communicate with a memory module comprising a low power double data rate (LPDDR) memory module.

In an eleventh aspect, a method includes receiving, by a memory controller from a host device through a first channel, a hash filter indicating a first subset of rows in a memory array; and refreshing, by the memory controller, a second subset of rows in the memory array based on the hash filter.

In a twelfth aspect, in combination with one or more of the eleventh aspect through the eleventh aspect, the hash filter indicates valid rows of the memory array as the first subset of rows.

In a thirteenth aspect, in combination with one or more of the eleventh aspect through the twelfth aspect, the hash filter comprises at least one of a Bloom filter, a Cuckoo filter, a linear probing filter, or a XOR filter.

In a fourteenth aspect, in combination with one or more of the first aspect through the thirteenth aspect, the method further includes receiving, from the host device, an indication to enter self-refresh mode, wherein after receiving the indication to enter the self-refresh mode, the memory controller performs refreshing of the second subset of rows based on the hash filter.

In a fifteenth aspect, in combination with one or more of the eleventh aspect through the fourteenth aspect, the hash filter is received as part of the indication to enter the self-refresh mode.

In a sixteenth aspect, in combination with one or more of the eleventh aspect through the fifteenth aspect, receiving the indication to enter the self-refresh mode comprises receiving an indication of the host device entering a sleep mode.

In a seventeenth aspect, in combination with one or more of the eleventh aspect through the sixteenth aspect, refreshing the second subset of rows comprises refreshing only the first subset of rows in the memory array.

In an eighteenth aspect, in combination with one or more of the eleventh aspect through the seventeenth aspect, in combination with one or more of the first aspect through the eighteenth aspect, refreshing the second subset of rows based on the hash filter comprises: incrementing a counter from a starting value to a count value; and for each value of the counter: determining a row address corresponding to a counter value based on the hash filter; and refreshing the memory array at the row address.

In a nineteenth aspect, in combination with one or more of the eleventh aspect through the nineteenth aspect, determining the row address comprises adding a value from the hash filter with a starting address, and the row address and the count value are received from the host device.

In a twentieth aspect, in combination with one or more of the eleventh aspect through the twentieth aspect, the memory controller is configured to communicate with a memory module comprising a low power double data rate (LPDDR) memory module.

In a twenty-first aspect, an apparatus includes at least one processor; and a memory controller coupled to the at least one processor and to a memory system through a channel and configured to communicate with the memory system through the channel, wherein the at least one processor is configured to perform operations including: saving data to a first subset of rows in a memory array of the memory system through the memory controller; determining a hash filter corresponding to the first subset of rows; and copying, through the memory controller, the hash filter to the memory system.

In a twenty-second aspect, in combination with one or more of the twenty-first aspect through the twenty-second aspect, wherein the at least one processor is configured to perform further operations including: receiving an indication to enter a sleep mode, wherein saving the data is performed after receiving the indication to enter the sleep mode; transmitting, by the at least one processor, an indication to enter self-refresh mode to the memory system through the memory controller after receiving the indication to enter the sleep mode; and entering the sleep mode after copying the hash filter to the memory system.

In a twenty-third aspect, in combination with one or more of the twenty-first aspect through the twenty-third aspect, the data comprises context data corresponding to at least some applications executing on the at least one processor when the indication to enter the sleep mode is received.

In a twenty-fourth aspect, in combination with one or more of the twenty-first aspect through the twenty-fourth aspect, the hash filter comprises at least one of a Bloom filter, a Cuckoo filter, a linear probing filter, or a XOR filter.

In a twenty-fifth aspect, in combination with one or more of the twenty-first aspect through the twenty-fifth aspect, the memory controller is configured to communicate with a double data rate (DDR) memory system.

In a twenty-sixth aspect, in combination with one or more of the twenty-first aspect through the twenty-sixth aspect, a method for operating a memory system, such as by a processor through a memory controller coupled to the memory system, comprises saving, by at least one processor of a host device coupled to a memory system through a channel by a memory controller, data to a first subset of rows in a memory array of the memory system through the memory controller; determining, by the at least one processor, a hash filter corresponding to the first subset of rows; and copying, by the at least one processor through the memory controller, the hash filter to the memory system.

In a twenty-seventh aspect, in combination with one or more of the twenty-first aspect through the twenty-seventh aspect, the method includes receiving an indication to enter a sleep mode, wherein saving the data is performed after receiving the indication to enter the sleep mode; transmitting, by the at least one processor, an indication to enter self-refresh mode to the memory system through the memory controller after receiving the indication to enter the sleep mode; and entering the sleep mode after copying the hash filter to the memory system.

In a twenty-eighth aspect, in combination with one or more of the twenty-first aspect through the twenty-eighth aspect, the data comprises context data corresponding to at least some applications executing on the at least one processor when the indication to enter the sleep mode is received.

In a twenty-ninth aspect, in combination with one or more of the twenty-first aspect through the twenty-ninth aspect, the hash filter comprises at least one of a Bloom filter, a Cuckoo filter, a linear probing filter, or a XOR filter.

In a thirtieth aspect, in combination with one or more of the twenty-first aspect through the thirtieth aspect, the apparatus is a wireless device, such as a user equipment or a base station.

In the description of embodiments herein, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating," or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the description and examples herein use the term "device" to describe various aspects of the disclosure, the term "device" is not limited to a specific configuration, type, or number of objects. As used herein, an apparatus may include a device or a portion of the device for performing the described operations.

Certain components in a device or apparatus described as "means for accessing," "means for receiving," "means for sending," "means for using," "means for selecting," "means for determining," "means for normalizing," "means for multiplying," or other similarly-named terms referring to one or more operations on data, such as image data, may refer to processing circuitry (e.g., application specific integrated circuits (ASICs), digital signal processors (DSP), graphics processing unit (GPU), central processing unit (CPU)) configured to perform the recited function through hardware, software, or a combination of hardware configured by software.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-2 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to the figures included with this description may be combined with one or more blocks (or operations) described with reference to another of the figures. For example, one or more blocks (or operations) of FIG. 3 may be combined with one or more blocks (or operations) of FIG. 1 or FIG. 2.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, opposing terms such as "upper" and "lower," or "front" and back," or "top" and "bottom," or "forward" and "backward" are sometimes used for ease of describing the figures, and indicate relative positions corresponding to the orientation of the figure on a properly oriented page, and may not reflect the proper orientation of any device as implemented.

As used herein, the term "coupled to" in the various tenses of the verb "couple" may mean that element A is directly connected to element B or that other elements may be connected between elements A and B (i.e., that element A is indirectly connected with element B), to operate certain intended functions. In the case of electrical components, the term "coupled to" may also be used herein to mean that a wire, trace, or other electrically conductive material is used to electrically connect elements A and B (and any components electrically connected therebetween). In some examples, the term "coupled to" mean a transfer of electrical energy between elements A and B, to operate certain intended functions.

In some examples, the term "electrically connected" mean having an electric current or configurable to having an electric current flowing between the elements A and B. For example, the elements A and B may be connected via resistors, transistors, or an inductor, in addition to a wire, trace, or other electrically conductive material and components. Furthermore, for radio frequency functions, the elements A and B may be "electrically connected" via a capacitor.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

The term "substantially" is defined as largely, but not necessarily wholly, what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An apparatus, comprising:

a memory controller coupled to a memory array through a first bus and configured to access data stored in the memory array through the first bus, the memory controller configured to couple to a host device through a channel and configured to perform operations comprising:

obtaining, from the host device through the channel, a hash filter indicating a first subset of rows in the memory array, wherein the hash filter indicates rows of the memory array storing valid data as the first subset of rows;

receiving, from the host device through the channel, an indication to enter self-refresh mode, wherein the host device enters a sleep mode after the hash filter is obtained and the indication to enter the self-refresh mode is received; and refreshing, by the memory controller after receiving the indication, only the first subset of rows in the memory array based on the hash filter according to the self-refresh mode.

2. The apparatus of claim 1, wherein the hash filter comprises at least one of a Bloom filter, a Cuckoo filter, a linear probing filter, or a XOR filter.

3. The apparatus of claim 1, wherein the hash filter is received as part of the indication to enter the self-refresh mode.

4. The apparatus of claim 1, wherein receiving the indication to enter the self-refresh mode comprises receiving an indication of the host device entering the sleep mode.

5. The apparatus of claim 1, wherein refreshing the first subset of rows based on the hash filter comprises:

incrementing a counter from a starting value to a count value; and for each value of the counter:

determining a row address corresponding to a counter value based on the hash filter; and refreshing the memory array at the row address.

6. The apparatus of claim 5, wherein:

determining the row address comprises adding a value from the hash filter with a starting address, and the row address and the count value are received from the host device.

7. The apparatus of claim 1, wherein the memory controller is configured to communicate with a memory module comprising a low power double data rate (LPDDR) memory module.

8. A method, comprising:

obtaining, by a memory controller from a host device through a first channel, a hash filter indicating a first subset of rows in a memory array, wherein the hash filter indicates rows of the memory array storing valid data as the first subset of rows;

receiving, by the memory controller from the host device through the first channel, an indication to enter self-refresh mode, wherein the host device enters a sleep mode after the hash filter is obtained and the indication to enter the self-refresh mode is received; and refreshing, by the memory controller after receiving the indication, only the first subset of rows in the memory array based on the hash filter and according to the self-refresh mode.

9. The method of claim 8, wherein the hash filter comprises at least one of a Bloom filter, a Cuckoo filter, a linear probing filter, or a XOR filter.

10. The method of claim 8, wherein the hash filter is received as part of the indication to enter the self-refresh mode.

11. The method of claim 8, wherein receiving the indication to enter the self-refresh mode comprises receiving an indication of the host device entering the sleep mode.

12. The method of claim 8, wherein refreshing the first subset of rows based on the hash filter comprises:

incrementing a counter from a starting value to a count value; and for each value of the counter:

determining a row address corresponding to a counter value based on the hash filter; and refreshing the memory array at the row address.

13. The method of claim 12, wherein:

determining the row address comprises adding a value from the hash filter with a starting address, and the row address and the count value are received from the host device.

14. The method of claim 8, wherein the memory controller is configured to communicate with a memory module comprising a low power double data rate (LPDDR) memory module.

15. An apparatus, comprising:

at least one processor; and a memory controller coupled to the at least one processor and to a memory system through a channel and configured to communicate with the memory system through the channel, wherein the at least one processor is configured to perform operations including:

saving data to a first subset of rows in a memory array of the memory system through the memory controller;

determining a hash filter corresponding to the first subset of rows, wherein the hash filter indicates rows of the memory array storing valid data as the first subset of rows;

receiving an indication to enter a sleep mode, wherein saving the data is performed after receiving the indication to enter the sleep mode;

transmitting, by the at least one processor, an indication to enter self-refresh mode to the memory system through the memory controller after receiving the indication to enter the sleep mode;

copying, through the memory controller, the hash filter to the memory system; and entering the sleep mode after copying the hash filter to the memory system.

16. The apparatus of claim 15, wherein the data comprises context data corresponding to at least some applications executing on the at least one processor when the indication to enter the sleep mode is received.

17. The apparatus of claim 15, wherein the hash filter comprises at least one of a Bloom filter, a Cuckoo filter, a linear probing filter, or a XOR filter.

18. The apparatus of claim 15, wherein the memory controller is configured to communicate with a double data rate (DDR) memory system.

19. A method, comprising:

saving, by at least one processor of a host device coupled to a memory system through a channel by a memory controller, data to a first subset of rows in a memory array of the memory system through the memory controller;

determining, by the at least one processor, a hash filter corresponding to the first subset of rows, wherein the hash filter indicates rows of the memory array storing valid data as the first subset of rows;

receiving an indication to enter a sleep mode, wherein saving the data is performed after receiving the indication to enter the sleep mode;

transmitting, by the at least one processor, an indication to enter self-refresh mode to the memory system through the memory controller after receiving the indication to enter the sleep mode;

copying, by the at least one processor through the memory controller, the hash filter to the memory system; and entering the sleep mode after copying the hash filter to the memory system.

20. The method of claim 19, wherein the data comprises context data corresponding to at least some applications executing on the at least one processor when the indication to enter the sleep mode is received.

21. The method of claim 19, wherein the hash filter comprises at least one of a Bloom filter, a Cuckoo filter, a linear probing filter, or a XOR filter.

22. The method of claim 19, wherein the memory controller is configured to communicate with a double data rate (DDR) memory system.

* * * * *